Dec. 30, 1924.
F. Q. RAST
CONTAINER
Filed Nov. 20, 1922
1,521,319
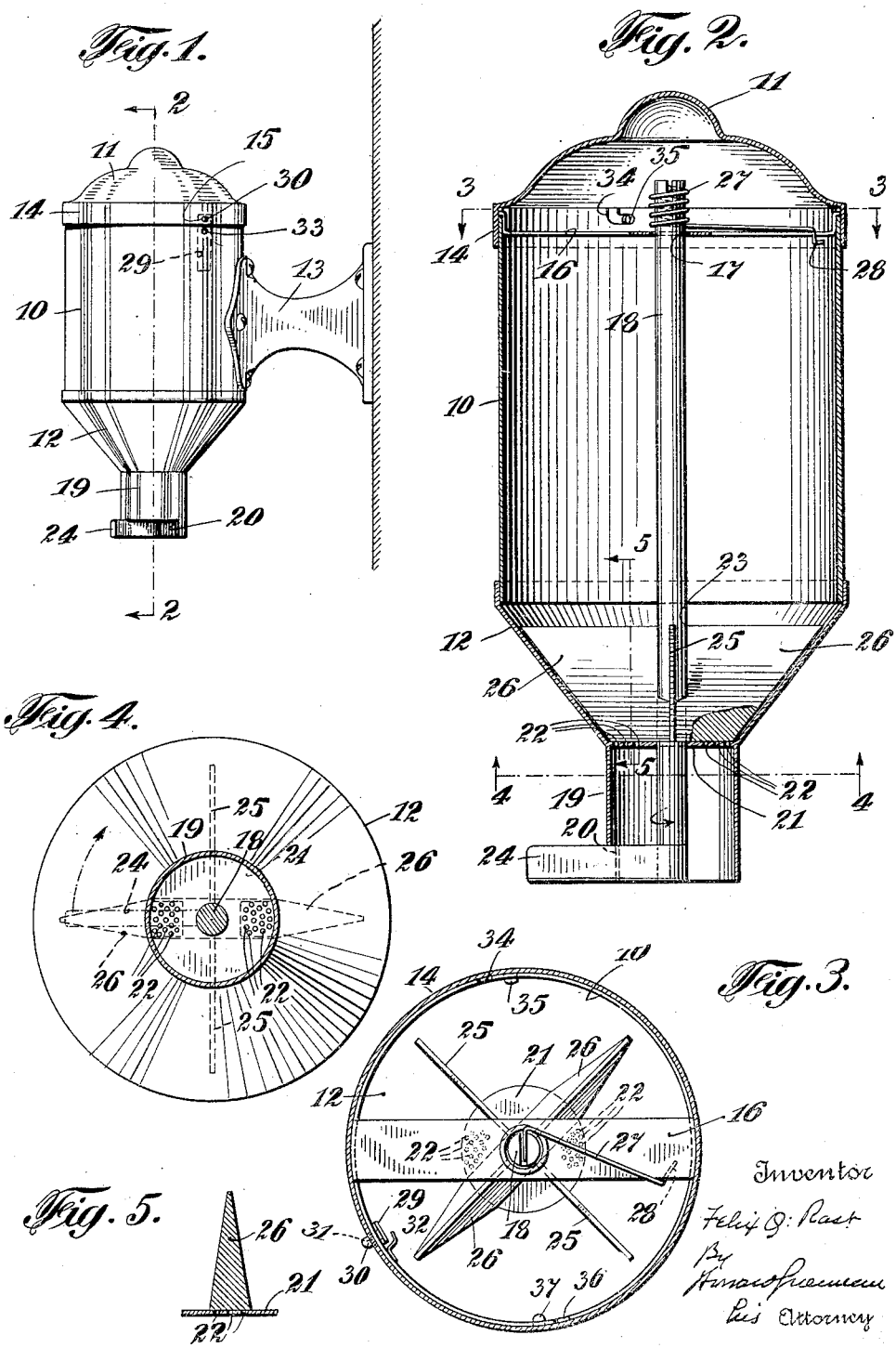

Patented Dec. 30, 1924.

1,521,319

UNITED STATES PATENT OFFICE.

FELIX Q. RAST, OF NEW YORK, N. Y., ASSIGNOR TO LIGHTFOOT SCHULTZ COMPANY, OF HOBOKEN, NEW JERSEY, A CORPORATION OF NEW YORK.

CONTAINER.

Application filed November 20, 1922. Serial No. 602,132.

*To all whom it may concern:*

Be it known that I, FELIX Q. RAST, a citizen of the United States, residing at New York city, county of New York, borough of Manhattan, and State of New York, have invented new and useful Improvements in Containers, of which the following is a full, clear, and exact specification.

My invention relates to containers and refers particularly to containers suitable for use with powder contents.

The object of my invention is a container which will maintain its contents practically free from the atmosphere and which will allow of the ready removal of portions of said contents as desired, and is directed particularly to containers for use with powders, such as tooth powder, soap powder, &c., which are liable to cake and become hard when submitted to an excess of atmospheric moisture.

While I do not limit myself to the use of my device in connection with soap powders, it is particularly adapted for that purpose in that it preserves the contents in powder form, while allowing the removal of desired quantities with ease and certainty, it being so arranged and constructed that a simple movement of a handle will open the container, deposit powder within the hand and close the container to preserve its contents.

In the accompanying drawings, illustrating one form of the device of my invention, similar parts are designated by similar numerals.

Figure 1 is a side plan view of one form of my device.

Figure 2 is an enlarged perpendicular cross-section of Figure 1.

Figure 3 is a top plan view of Figure 1, with the cover in section and the device in open position.

Figure 4 is a section through the line 4—4 of Figure 2, with the device in closed position.

Figure 5 is a section through the line 5—5 of Figure 2.

The particular form of the device of my invention, shown in the accompanying drawings, comprises a receptacle having the annular side 10, the top 11 and the truncated conical lower portion 12.

The side 10 has the extended bracket 13 capable of attachment to a vertical surface for purposes of retaining the device in working position.

The top 11 has an annular downwardly extending flange 14, capable of placement over the side 10 to effect a jointure and an opening 15, for purposes described later.

A cross bar 16 carried by the upper portion of the side 10 has an opening 17 therein, which acts as a bearing for the revoluble shaft 18.

The lower portion 12 is extended downwardly into the conical mouth piece 19, having a recess 20 extending around a portion thereof. The bottom of the container comprises the horizontal transverse wall 21, having a plurality of series of perforations 22, 22 positioned diametrically opposite to each other.

The revoluble shaft 18 extends downwardly through the opening 17 of the support 16, through the opening 23 in the bottom 21 and below the upper portion of the recess 20, the handle 24 fixedly attached to the shaft 18 being movable within the recess 20, its horizontal movement being limited by the sides of said recess walls.

The shaft 18 carries a pair of oppositely opposed blades 25, 25, the side edges of which have a slight clearance from the inner face of the member 12, and the bottom edges of which have a greater clearance from the top face of the bottom 21.

Axially perpendicular to the blades 25, 25 and fixedly attached to the shaft 18 are two wedge-shaped closure blades 26, 26, the side edges of which have a slight clearance from the inner face of the member 12, and the bottom edges of which have a slight clearance from the top face of the bottom 21.

A spring 21 fixedly attached to the shaft 18 and maintained upon the member 16 by the spring lap 28 tends to maintain the handle 24 against one side of the recess 20 and the closure wings 26, 26 over the openings 22 of the bottom 21 when in normal position.

Fixedly attached to the inner face of the side 10 is a resilient plate 29 having a locking bar 30 extending through the hole 31 of the side 10 when in normal position. A member 32 fixedly attached to the inner face of the side 10 limits the inner movement of the plate 29. The side 10 has an opening 33 in alignment with the plate 29.

The side 10 has a bayonet-joint recess 34 capable of receiving the pin 35 of the flange 14 and a bayonet-joint recess 36 capable of receiving the pin 37 of the flange 14.

The arrangement of pins and bayonet-joints is such that when the top 11 is pressed downwardly upon the side 10, the flange 14 will press the pin 30 inwardly, the pin 35 will enter the bayonet-joint 34 and the pin 37 will enter the bayonet-joint 36. A partial turn of the top 11 will move the pins 35 and 37 horizontally within the bayonet-joints until the pin 30 comes in alignment with the hole 15 of the side 10 and the hole 31 of the flange 14, when it will be forced outwardly by the plate 29, thus locking the top 11 to the side 10.

To unlock the top, a wire is inserted through the opening 15 of the side 10 and pushed inwardly, thus moving the pin 30 from engagement with the top and side, allowing the top to be revolved to release the pins 35 and 37 from the bayonet-joint recesses 34 and 36.

The operation of the device is as follows:—

The top 11 is unlocked from the side 10, as described above, and removed. The spring 27 maintains the shaft 18 in a position in which the handle 24 abuts upon one side of the recess 20, the blades 26, 26 covering the openings 22, 22 of the bottom 21, thus preventing the escape of the powder contents of the container. Soap powder is then introduced into the container and the top 11 replaced and locked.

When it is desired to employ the soap powder contents, the handle 24 is revolved until it abuts upon the other side of the recess 20, thus revolving the shaft 18 and the blades 25, 25, 26, 26. This revoluble movement of the wings gives a circular movement to the contents of the container, the blades 26, 26 being removed as a covering for the openings 22, 22, while the wing movement causes the powder to pass over and through the openings 22, 22. As the handle movement is a limited one, a definite quantity of powder will be allowed to escape. When pressure is removed from the handle, the spring 17 brings the movable parts to their former position, the blades 26, 26 again closing the openings 22, 22.

In order that all of the powder in the bottom of the container may be passed over and through the openings 22, 22, the lower edges of the blades 25, 25 are further removed from the bottom 21 than the lower edges of the blades 26, 26. By this construction the blades 25, 25 do not push all of the powder backwardly upon their return movement, thus allowing it to be moved forwardly by the next forward movement of the blades 26, 26.

A consideration of the above shows that my device, when not in use, practically protects the contents from atmospheric contact, the blades 26, 26 closing the exit openings 22, 22, but that the contents are readily removed in practically equal quantities by the movement of the handle, allowing the powder to fall within the same hand that manipulates the device, the exit openings being immediately closed by the removal of pressure upon the handle and that the construction is such that the wet hand can not come into contact with the perforated bottom, thus preventing the clogging of the perforations due to the formation of a wet powder mass.

I do not limit myself to the particular size, shape, number or arrangement of parts as shown and described, as they are given simply as an example, in order to clearly describe my invention.

What I claim is:—

1. In a powder container, in combination, a receptacle, the bottom of which has a plurality of series of perforations, a cylindrical member extending downwardly from the bottom, a revoluble shaft situated perpendicularly within the container, a plurality of wedge-shaped blades fixedly attached to the shaft, the lower faces of which practically abut upon the inner face of the bottom, closing the perforations when the shaft is in normal position, means exterior of the cylindrical member whereby the shaft may be revolved from its normal position, removing the wedge-shaped blades from their closure position and means whereby the shaft will be returned to its normal position when released, closing the perforations.

2. In a powder container, in combination, a receptacle, the bottom of which has a plurality of series of perforations, a cylindrical member extending downwardly from the bottom, a revoluble shaft situated perpendicularly within the container, a plurality of wedge-shaped blades fixedly attached to the shaft, the lower faces of which practically abut upon the inner face of the bottom, closing the perforations when the shaft is in normal position, a plurality of flat blades fixedly attached to the shaft intermediate of the wedge-shaped blades, means exterior of the receptacle whereby the shaft may be revolved from its normal position, removing the wedge-shaped blades from their closure position and means whereby the shaft will be returned to its normal position when released, closing the perforations.

3. In a powder container, in combination, a receptacle, the downwardly extended contracted bottom of which has a plurality of series of perforations, a cylindrical member extending downwardly from the bottom, a revoluble shaft situated perpendicularly within the container extending outwardly into the cylindrical member, a plurality of wedge-shaped blades fixedly attached to the shaft, the lower faces of which practically abut upon the inner face of the bottom, closing the perforations when the shaft is in normal position, a plurality of flat blades fixedly attached to the shaft intermediate of the wedge-shaped blades, means exterior of the cylindrical member whereby the shaft may be revolved from its normal position, removing the wedge-shaped blades from their closure position and means whereby the shaft will be returned to its normal position when released, closing the perforations.

4. In a powder container, in combination, a receptacle, the bottom of which has a plurality of series of perforations, a cylindrical member extending downwardly from the bottom, a revoluble shaft situated perpendicularly within the container extending into the cylindrical member, a plurality of wedge-shaped blades fixedly attached to the shaft, the lower faces of which practically abut upon the inner face of the bottom, closing the perforations when the shaft is in normal position, a plurality of flat blades fixedly attached to the shaft intermediate of the wedge-shaped blades, the lower edges of which are spaced further from the face of the bottom than are the wedge-shaped blades, means exterior of the cylindrical member whereby the shaft may be revolved from its normal position, removing the wedge-shaped blades from their closure position and means whereby the shaft will be returned to its normal position when released, closing the perforations.

5. In a powder container, in combination, a receptacle, the downwardly extended contracted bottom of which has a plurality of series of perforations, a cylindrical member extending downwardly from the bottom, a revoluble shaft situated perpendicularly within the container extending outwardly into the cylindrical member, a plurality of wedge-shaped blades fixedly attached to the shaft, the lower faces of which practically abut upon the inner face of the bottom, closing the perforations when the shaft is in normal position, a plurality of flat blades fixedly attached to the shaft intermediate of the wedge-shaped blades, the lower edges of which are spaced further from the face of the bottom than are the wedge-shaped blades, means exterior of the cylindrical member whereby the shaft may be revolved from its normal position, removing the wedge-shaped blades from their closure position and means whereby the shaft will be returned to its normal position when released, closing the perforations.

Signed at New York city in the county of New York and State of New York this 27th day of October, 1922.

FELIX Q. RAST.